April 16, 1968 E. G. OBEDA 3,378,429
METHOD AND APPARATUS FOR TREATING MATERIAL WITH SONIC ENERGY
Filed Jan. 4, 1965 2 Sheets-Sheet 1
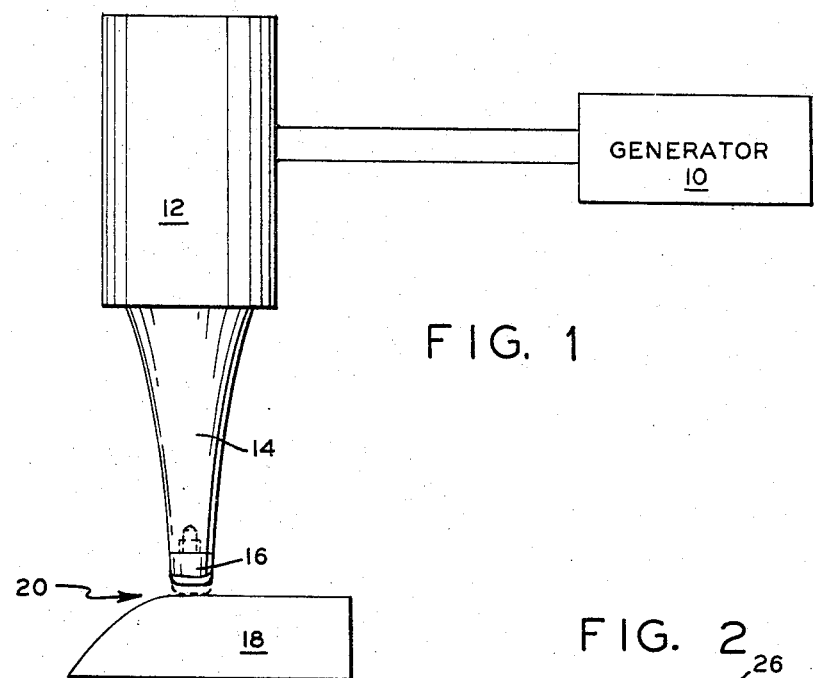
FIG. 1
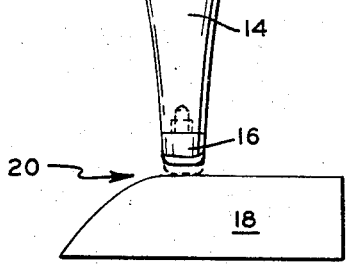
FIG. 2
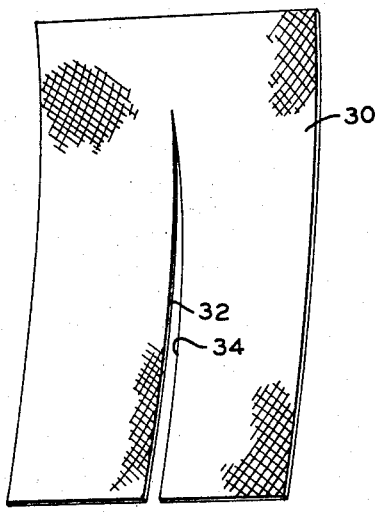
FIG. 4
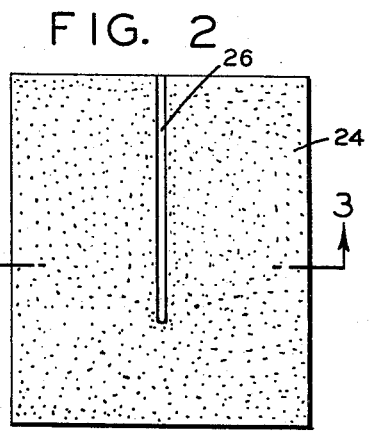
FIG. 3
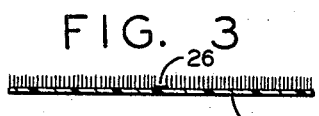
INVENTOR.
EDWARD G. OBEDA
BY
Erwin B. Steinberg April 16, 1968 E. G. OBEDA 3,378,429
METHOD AND APPARATUS FOR TREATING MATERIAL WITH SONIC ENERGY
Filed Jan. 4, 1965 2 Sheets-Sheet 2

INVENTOR.
EDWARD G. OBEDA
BY
*Erwin B. Steinberg*

United States Patent Office 3,378,429
Patented Apr. 16, 1968

3,378,429
METHOD AND APPARATUS FOR TREATING MATERIAL WITH SONIC ENERGY
Edward G. Obeda, Brookfield, Conn., assignor, by mesne assignments, to Branson Instruments, Incorporated, a corporation of Delaware
Filed Jan. 4, 1965, Ser. No. 423,236
4 Claims. (Cl. 156—515)

ABSTRACT OF THE DISCLOSURE

An ultrasonically activated tool is used to seal and slit textile material made of synthetic fibers. The process is particularly suited for woven and tufted material, preventing frayed edges and unraveling of threads. In one embodiment, the tool has a first surface for sealing the material and a second surface adjacent the first surface for severing the material along its sealed portion, whereby to accomplish sealing and cutting in a single pass as the material is fed between the tool and an opposing anvil.

Figure 5:
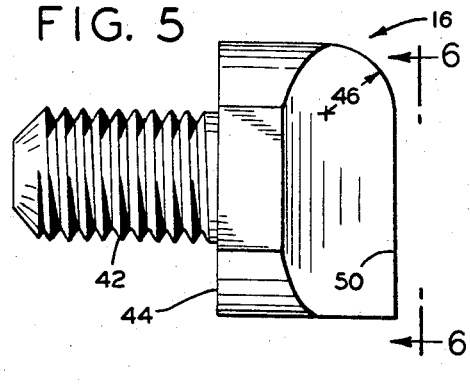

This invention concerns a method and apparatus for sonically treating textile material, particularly woven, tufted, combed, and similar material manufactured from synthetic fibers. Quite specifically, this invention concerns the sealing of individual fibers, tufts, threads, or filaments in synthetic ribbon or sheet material with or without an attendant cutting or slitting operation.

Most textile materials are manufactured in standard lengths and widths. Carpeting material, for instance, which comprises pile or tufted fibers is fabricated in standard predetermined widths and lengths. When cutting such material to room size short pieces of the cut pile fall off and a fraying edge occurs which deteriorates the good material portion. In order to avoid this condition, the cut edge is either bound with a binding tape, or in wall-to-wall installations, the carpet material is fastened to a molding, or tuned over. Similarly, woven material cannot readily be cut without special provisions to prevent the unraveling of cross threads which have been cut. As a consequence chair and seat belt webbing is woven on narrow gauge textile looms to the precise width of the finished product, whereas greater economies could be achieved by weaving such material on standard width textile looms and subsequently slitting the material to the desired width. However, in view of the unraveling of the cut threads, it has not been possible to employ this more economical method.

Experiments have shown that material made of synthetic thermoplastic fibers and filaments, such as polypropylene, nylon, and the like, can be sealed by sonic energy and, more importantly, sealed and simultaneously cut by exposure and contact with sonic energy, thus preventing the unraveling of woven threads and obviating the need for special binding tapes. It has been found that by using a sonically energized cutting implement of suitable shape each of the tufts or threads cut can be sealed and bonded. The advantages and economies derived from this discovery are immediately apparent as firstly, materials can be manufactured in standard widths and cut to any desired length and width, secondly, the appearance of the fabric edge is enhanced due to the absence of a seam or of a binding tape and, thirdly, the separate binding operation is eliminated.

One of the objects of this invention, therefore, is the provision of an improved method and apparatus for treating woven, tufted, combed, and the like material made from synthetic thermoplastic fibers.

Another object of this invention is the provision of a method and apparatus for treating woven, tufted, combed and the like material made from synthetic fibers with sonic energy in order to prevent loose tufts or threads, or unraveling of fibers and filaments after slitting the material.

A further object of this invention is the provision of a method and apparatus for treating textile material made of synthetic fibers with sonic energy in order to permit the use of more economical manufacturing methods and equipment.

A still further object of this invention is the provision of a method and apparatus for treating filamentary material made of synthetic thermoplastic fibers with sonic energy so as to provide in one single operation a sealed cut edge.

Figure 6:
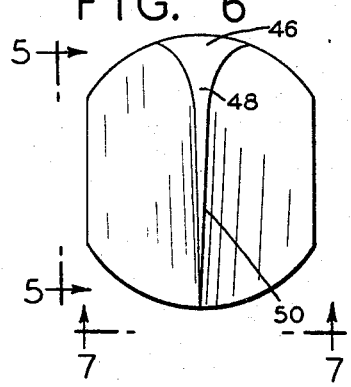
Figure 7:
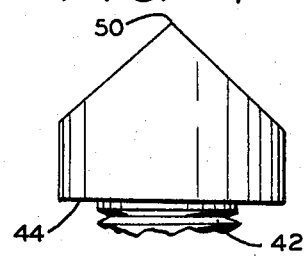
Figure 8:
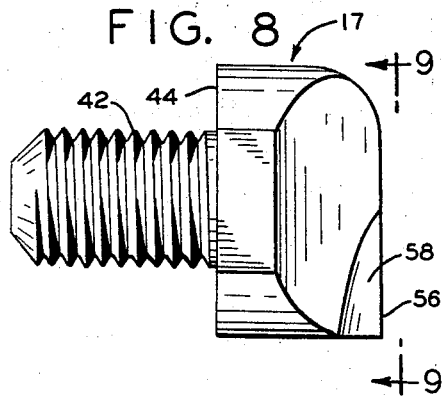
Figure 9:
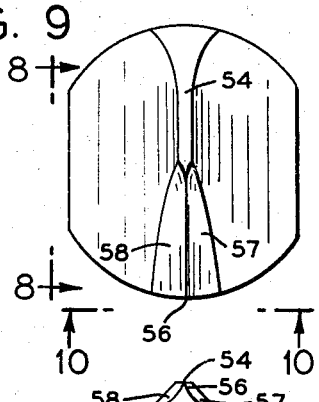
Figure 10:
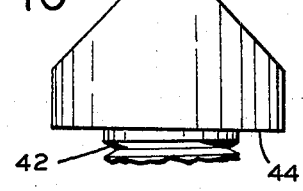

Further and still other objects of this invention will be more clearly apparent by reference to the following description when taken in conjunction with the accompanying drawings in which:

FIGURE 1 is a schematic view of the typical apparatus;
FIGURE 2 is a plan view of a typical textile material indicating the effect of sonic exposure;
FIGURE 3 is a sectional view along lines 3—3 in FIGURE 2;
FIGURE 4 is a plan view of a woven material showing the slitting and sealing effect;
FIGURE 5 is a side view of a typical tool employed for sealing and cutting;
FIGURE 6 is a bottom plan view of FIGURE 5;
FIGURE 7 is a view along lines 7—7 in FIGURE 6;
FIGURE 8 is a side view of another exemplary construction of a tool usable for this invention;
FIGURE 9 is a bottom plan view of FIGURE 8; and
FIGURE 10 is another side view taken along lines 10—10 in FIGURE 9.

Referring now to the figures and FIGURE 1 in particular, there is shown a generator 10 of electric energy coupled for energizing a high power sonic transducer 12 which is fitted with a horn 14 and a tool tip 16 threadedly coupled to the horn 14. In the preferred embodiment, the transducer 12 is a high power source of sonic energy as disclosed in co-pending application for U.S. Letters Patent of Stanley E. Jacke et al., Ser. No. 125,568, filed July 20, 1961, entitled "Sonic Disperser." When energizing the transducer 12 with suitable electrical energy, let us say, 50 to 100 watts and a frequency of 20 kilocycles per second the horn will vibrate in its longitudinal direction at the stated frequency, and the tool 16, rigidly coupled thereto, will oscillate back and forth relative to the support surface 18 which acts as an anvil. The lengthened position of the horn is indicated by the broken lines in contact with the surface 18. Preferably the support surface 18 is made from steel and the tool 16 is a titanium or tungsten carbide tip.

It has been found that when feeding material made of synthetic thermoplastic fibers or filaments in the direction of the arrow 20 between the support surface 18 and the sonically vibrating tip 16, the fibers in contact with the vibrating tool are fused to one another or, when exerting a sufficient compressional force, to the base material.

While the precise reason for this fusing or sealing effect is not clearly established, it is believed that the vibrating tool creates, by virtue of its high speed low amplitude oscillations, localized frictional losses, the heat of which causes the fibers to soften and to fuse. This welding or fusing action is very rapid and occurs within such a well defined zone as to leave the surrounding material area completely undisturbed.

FIGURES 2 and 3 show combed or tufted material 24, having upstanding fibers to provide a velvet like appearance, such as is used for lining window channels in automobiles or similar applications. When feeding this material between the anvil 18 and a narrow vibrating tool 16, and the tool is designed and adjusted so as to compress the fibers rather than to cut the base material, a channel or groove 26 is obtained at which the material, subsequently, may be either cut or folded. The synthetic fibers or filaments are fused to one another and to the base material, thus providing this channel type appearance.

In FIGURE 4 a woven material 30 is shown made of monofilament polypropylene material, the type of material used commonly for chair or seat belt webbing. When feeding this material between the supporting surface and the sonically vibrating tool 16, the material can simultaneously be sealed and slit, thus accomplishing both operations in one single pass. The sealing of the cut edge is shown at numerals 32 and 34 and occurs within a very narrow zone. All of the individual fiber ends are fused, thereby preventing unraveling. It is possible, therefore, to manufacture woven material in large widths and slit the material to any desired size, width and length.

A typical combined sealing and slitting tool is shown in FIGURES 5 and 7. The tool 16 is provided with a threaded stud 42 and a shoulder 44 to engage the horn 14 (FIGURE 1) and vibrate therewith in unison toward and away from the support 18. The tool is provided with a radius 46 to form an entrance opening into which the material is fed and passed to the converging surfaces between the tool and the supporting surface. The supporting surface is provided with a slight taper to form, in combination with the tool, a narrowing gap toward the exit portion of this work station. The tool is equipped with a compressing surface 48 to compress the fibers and merges into a sharp knife edge 50 which severs the material as the tool impacts on the supporting surface 18. Thus the tool acts very much like a cleaver.

An alternative tool construction is shown in FIGURES 8 through 10 wherein the tool 17 is provided with a compressing surface 54 to first compress and seal the material and a subsequent cutting or knife edge 56 formed by the intersection of two articulate relief surfaces 57 and 58.

This latter tool is particularly suited for carpet-like pile fabric made of synthetic filaments. Feeding the material at a fairly rapid pace through the gap between the supporting surface and the sonically vibrating tool, the material is cut and, unlike a standard shearing action which leaves short pieces of cut pile to fall off the material, all loose and cut pieces are sealed to the base fabric, thus allowing no stray pile and preventing the pile and base from unraveling. Hence, a much cleaner slitting action is obtained, avoiding the usual dust and dirt particles laden atmosphere which contaminates the area surrounding the slitting station.

While it is believed that best and most successful operation is obtained when the tool operates at frequencies in the range above 15,000 cycles per second, it will be appreciated that no limitation shall be implied therewith and that lower frequencies can provide adequate results except that the noise level at lower frequencies constitutes a rather disturbing feature to human operators.

While there have been described and illustrated certain specific embodiments of the present invention, it will be apparent to those skilled in the art that various changes and modifications may be made therein without deviating from the broad principle and intent of the present invention which shall be limited only by the scope of the appended claims.

What is claimed is:
1. In an apparatus for sealing and cutting material by sonic energy, said apparatus including an ultrasonic transducer provided with a horn for concentrating sonic energy, the frontal surface of said horn comprising:
   a first surface for engaging material to be sealed and severed, said surface being substantially flat for compressing and sealing material interposed between said first surface and an anvil along a comparatively narrow path responsive to sonic energy applied to the horn, and
   a second surface adjacent said first surface for subsequently engaging the sealed portion of the material within the confines of said path and providing a cut therethrough, said second surface being provided with a knife edge for cutting the material as such material is advanced successively from said first to said second surface.

2. In an apparatus for sealing and cutting by sonic energy as set forth in claim 1, wherein said knife edge of said second surface is provided with lateral relief surfaces, and such knife edge is disposed substantially along a medial axis which bisects the width of said first surface.

3. In an apparatus for sealing and cutting material by sonic energy as set forth in claim 1 wherein said frontal surface of the horn is a part of a threaded tool removably fastened to said horn.

4. In an apparatus for sealing and cutting material as set forth in claim 1 wherein said transducer operates at a frequency of at least 16,000 cycles per second.

References Cited
UNITED STATES PATENTS

| | | | |
|---|---|---|---|
| 2,307,424 | 1/1943 | Savage | 156—73 |
| 2,452,211 | 10/1948 | Rosenthal | 156—73 |
| 2,845,072 | 7/1958 | Shafer | 30—45 |
| 3,022,814 | 2/1962 | Bodine | 156—73 |
| 3,086,288 | 4/1963 | Balamuth et al. | 30—272 |

FOREIGN PATENTS

| | | |
|---|---|---|
| 687,357 | 5/1964 | Canada. |

DOUGLAS J. DRUMMOND, *Primary Examiner.*